US008229938B2

(12) United States Patent
Bal et al.

(10) Patent No.: US 8,229,938 B2
(45) Date of Patent: Jul. 24, 2012

(54) SYSTEMS AND METHODS FOR CORRELATING META-DATA MODEL REPRESENTATIONS AND ASSET-LOGIC MODEL REPRESENTATIONS

(75) Inventors: Rajpaul Singh Bal, Kelowna (CA); Mark Lochmann, Houston, TX (US); Chaminda Peries, Sugar Land, TX (US); Laurence Reid, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 344 days.

(21) Appl. No.: 12/418,367

(22) Filed: Apr. 3, 2009

(65) Prior Publication Data
US 2010/0005111 A1 Jan. 7, 2010

Related U.S. Application Data

(60) Provisional application No. 61/042,542, filed on Apr. 4, 2008.

(51) Int. Cl.
*G06F 17/00* (2006.01)
(52) U.S. Cl. ............... 707/756; 707/803; 707/769
(58) Field of Classification Search .......... 707/756, 707/803, 769; 709/233
See application file for complete search history.

(56) References Cited

U.S. PATENT DOCUMENTS

| 5,710,918 | A  | 1/1998  | Lagarde et al. |
| 5,821,925 | A  | 10/1998 | Carey et al. |
| 5,930,786 | A  | 7/1999  | Carino, Jr. et al. |
| 6,219,057 | B1 | 4/2001  | Carey et al. |
| 6,266,619 | B1 | 7/2001  | Thomas et al. |
| 6,304,864 | B1 | 10/2001 | Liddy et al. |
| 6,356,844 | B2 | 3/2002  | Thomas et al. |
| 6,678,882 | B1 | 1/2004  | Hurley et al. |
| 6,792,431 | B2 | 9/2004  | Tamboli et al. |
| 6,826,483 | B1 | 11/2004 | Anderson et al. |
| 6,853,921 | B2 | 2/2005  | Thomas et al. |
| 6,988,270 | B2 | 1/2006  | Banavar et al. |
| 7,043,521 | B2 | 5/2006  | Eitel |
| 7,079,952 | B2 | 7/2006  | Thomas et al. |
| 7,146,356 | B2 | 12/2006 | Choi et al. |
| 7,243,093 | B2 | 7/2007  | Cragun et al. |

(Continued)

FOREIGN PATENT DOCUMENTS
EP 0747841 A1 11/1996
(Continued)

OTHER PUBLICATIONS

Waring, Burney, Theuveny, Bertrand. Davies, Dave; Guedroudj, Hamid, Danquigny, Jacques, Brink, James, Shyeh, Jane, Gibbons, Kate, Toro, Mario, Diez, Marta Duenas, Jakeman, Simon and Aksland, Tor Gunnar; Guidance on the Future of Real Time Production Optimisation in E&P; SPE Forum on RTPO; Nov. 6, 2007; 9 pages; Forum Steering Committee. WITSML, Wellsite Information Transfer Standard Markup Language; Energistics; [Internet] [retrieved on Mar. 27, 2009]. Retrieved from the Internet <URL: http://www.witsml.org/> 1 page.
The E&P Catalog; [Internet] [retrieved on Mar. 27, 2009]. Retrieved from the Internet <URL:http://www.flare-solutions.com/databases/infrastructure/FlareWebSite.nsf/current2004/epintro.html> 2 pages.
OpenSpirit; [Internet] [retrieved on Mar. 27, 2009]. Retrieved from the Internet <URL:http://openspirit.com/> 1 page.

(Continued)

*Primary Examiner* — Belix M Ortiz Ditren
(74) *Attorney, Agent, or Firm* — Crain Caton & James

(57) ABSTRACT

Systems and methods for correlating meta-data model representations and asset-logic model representations in a system model. The system model may be deployed in conjunction with a production allocation application, whereby data pertaining to allocation changes to a production system might be more readily identified for different purposes such as, for example, technical and/or fiscal allocation.

20 Claims, 4 Drawing Sheets

U.S. PATENT DOCUMENTS

| | | |
|---|---|---|
| 7,287,048 B2 | 10/2007 | Bourbonnais et al. |
| 7,478,024 B2 | 1/2009 | Gurpinar et al. |
| 7,519,503 B2 | 4/2009 | Midttun et al. |
| 2002/0052932 A1 | 5/2002 | Curtis et al. |
| 2003/0033179 A1 | 2/2003 | Katz et al. |
| 2003/0050807 A1* | 3/2003 | Hoffman et al. ............ 705/7 |
| 2003/0177481 A1 | 9/2003 | Amaru et al. |
| 2003/0188863 A1 | 10/2003 | Gilbert et al. |
| 2003/0197733 A1 | 10/2003 | Beauchamp et al. |
| 2003/0229900 A1 | 12/2003 | Reismann |
| 2004/0186762 A1 | 9/2004 | Beaven et al. |
| 2004/0230571 A1 | 11/2004 | Robertson |
| 2005/0071384 A1 | 3/2005 | Cotner et al. |
| 2005/0234889 A1 | 10/2005 | Fox et al. |
| 2006/0053196 A1 | 3/2006 | Spataro et al. |
| 2006/0122993 A1 | 6/2006 | Dettinger et al. |
| 2006/0167868 A1* | 7/2006 | Zhang et al. .............. 707/4 |
| 2006/0195416 A1 | 8/2006 | Ewen et al. |
| 2006/0265385 A1 | 11/2006 | Agrawal et al. |
| 2007/0073674 A1 | 3/2007 | McVeigh et al. |
| 2007/0094601 A1 | 4/2007 | Greenberg et al. |
| 2007/0180408 A1 | 8/2007 | Rusu et al. |
| 2007/0276851 A1 | 11/2007 | Friedlander et al. |
| 2008/0052358 A1 | 2/2008 | Beaven et al. |
| 2008/0065592 A1 | 3/2008 | Doyle |
| 2008/0072301 A1 | 3/2008 | Chia et al. |
| 2008/0127205 A1 | 5/2008 | Barros et al. |
| 2008/0177756 A1 | 7/2008 | Kosche et al. |
| 2008/0201728 A1 | 8/2008 | Midttun et al. |
| 2008/0255892 A1 | 10/2008 | Orangi et al. |
| 2009/0125362 A1 | 5/2009 | Reid et al. |
| 2009/0254569 A1 | 10/2009 | Paulk et al. |
| 2010/0005111 A1 | 1/2010 | Bal et al. |

FOREIGN PATENT DOCUMENTS

| | | |
|---|---|---|
| GB | 2382431 A | 5/2003 |
| WO | 9964959 A1 | 12/1999 |
| WO | 0127901 A1 | 4/2001 |
| WO | 0139086 A2 | 5/2001 |
| WO | 2006036127 A1 | 4/2006 |
| WO | 2006123040 A2 | 11/2006 |
| WO | 2008011309 A1 | 1/2008 |
| WO | 2008066872 A2 | 6/2008 |
| WO | 2008068114 A1 | 6/2008 |

OTHER PUBLICATIONS

POSC E&P Cataloguing; [Internet] [retrieved on Mar. 27, 2009]. Retrieved from the Internet <URL:http://posc.org/technical/epicat/epicat.shtml> 5 pages.

PetrisWINDS Enterprise; [Internet] [retrieved on Mar. 27, 2009]. Retrieved from the Internet <URL:http://petris.com/Products_&_Services/Data_Management/petriswindsenterprise.asp> 2 pages.

PRODML, WITSML for Production. [Internet] [retrieved on Mar. 27, 2009]. Retrieved from the Internet <URL: http://www.prodml.org/> 1 page.

Andy Howell, Obtaining Value From Oil & Gas Model Based Asset Management; Aspen Technology; 19 pages; presented at the Gas Processors Association May 19, 2004.

Extract, transform, load. Wikipedia. [Internet] [retrieved on Mar. 3, 2009]. Retrieved from the Internet <URL: http://en.wikipedia.org/wiki/Extract,_transform,_load> 8 pages.

Richard E. Ewing, Guan Qin, and Wei Zhao; High Performance Computing in Petroleum Applications; International Journal of Numerical Analysis and Modeling, Institute for Scientific Computing and Information, vol. 1, No. 1, pp. 1-16; 2004.

Steve Tobais, David Thompson, Usman Ahmed; Integrated Workflow Methodologies for Asset Teams; SPE Asia Pacific Conference on Integrated Modelling for Asset Management, Kuala Lumpur, Malaysia; pp. 23-24; Mar. 1998; abstract, 2 pages.

International Search Report & Written Opinion for International Patent Application No. PCT/US2009/39480; May 15, 2009; 10 pgs.; Commissioner for Patents; Alexandra, Virginia.

The International Search Report and the Written Opinion of the International Searching Authority, PCT/US10/25279, Apr. 8, 2010, 14 pages.

Ravi Madray, Carolina Coll, Gordon Veitch, Chokri Chiboub, Machiel Butter, Samy Azouzi, Smai Bahri, Brahim Yaich, Tamer Saada; "Integrated Field Modeling of the Miskar Field"; Europec/EAGE Conference and Exhibition; Rome, Italy; Jun. 9-12, 2008; 1 page [Abstract Only].

International Preliminary Report on Patentability; PCT/US10/25279; Nov. 14, 2011; 4 pages.

International Preliminary Report on Patentablity; PCT/US09/39480; Jan. 24, 2011; 9 pages.

* cited by examiner

First Oil ⟵ State ⟶ Asset Abandonment

SYSTEMS AND METHODS FOR CORRELATING META-DATA MODEL REPRESENTATIONS AND ASSET-LOGIC MODEL REPRESENTATIONS

CROSS-REFERENCE TO RELATED APPLICATIONS

The priority of U.S. Patent Application. No. 61/042,542, filed on Apr. 4, 2008, is hereby claimed, and the specification thereof is incorporated herein by reference. This application and U.S. Pat. Ser. No. 12/404,181, which is incorporated herein by reference, are commonly assigned to Landmark Graphics Corporation.

STATEMENT REGARDING FEDERALLY SPONSORED RESEARCH

Not applicable.

FIELD OF THE INVENTION

The present invention generally relates to correlating meta-data model representations and asset-logic model representations in a system model.

BACKGROUND OF THE INVENTION

Understanding and operating an oil and gas production asset as a single holistic system has been frustrated by significant impediments. For any asset, there are typically multiple applications, multiple data sets, multiple taxonomies and multiple stakeholders, some or all of which may be sharing common data across the asset. Interoperability among these programs, persons, and structures as a single system, while desired, has been frustrated by the lack of an underlying framework for handling the necessary transformations, translations, and definitions required between and among the various system components.

Attempts to provide this understanding and operation have previously focused on providing data replication, where each stakeholder group develops or receives its own version of the logical network and data model that includes all of its requirements. In these attempts, the act of transforming the data model by correlating changes between the data model representations has not been done or has been done crudely. Although some level of interoperability has been achieved by point to point integration, it is largely limited to supporting single workflows. Moreover, changes to the data model representations cannot be effectively controlled when each stakeholder can decide whether such changes should be applied (accepted) and communicated to the other stakeholders. Previous approaches thus, have been unable to account for reconciliation and data integrity issues in a systematic and/or system-wide way.

There is therefore, a need for systems and methods that provide uninterrupted interoperability among the various data sets, applications, taxonomies and stakeholders sharing data across a production asset. In other words, there is a need for transforming a system model by correlating only approved manipulations of meta-data model representations and asset-logic model representations in the system model.

SUMMARY OF THE INVENTION

The present invention therefore, meets the above needs and overcomes one or more deficiencies in the prior art by providing systems and methods for correlating only approved manipulations of meta-data-model representations and asset-logic model representations in a system model.

In one embodiment, the present invention includes a computer implemented method for correlating meta-data model representations and asset-logic model representations, which comprises: i) manipulating a system model, the system model comprising a meta-data model representation controlled by only a stakeholder and an asset-logic model representation controlled by only the stakeholder or another stakeholder; ii) notifying only at least one of the stakeholder and the another stakeholder of a manipulation of at least one of the meta-data model representation and the asset-logic model representation; iii) recording each manipulation approved or rejected by the at least one of the stakeholder and the another stakeholder; and iv) transforming the system model on a computer system by correlating only each approved manipulation between the meta-data model representation and the asset-logic model representation.

In another embodiment, the present invention includes a non-transitory program carrier device tangibly carrying computer executable instructions for correlating meta-data model representations and asset-logic model representations. The instructions are executable to implement: i) manipulating a system model, the system model comprising a meta-data model representation controlled by only a stakeholder and an asset-logic model representation controlled by only the stakeholder or another stakeholder; ii) notifying only at least one of the stakeholder and the another stakeholder of a manipulation of at least one of the meta-data model representation and the asset-logic model representation; iii) recording each manipulation approved or rejected by the at least one of the stakeholder and the another stakeholder; and iv) transforming the system model by correlating only each approved manipulation between the meta-data model representation and the asset-logic model representation.

In yet another embodiment, the present invention includes a computer readable medium carrying computer executable instructions for correlating meta-data model representations and asset-logic model representations, the computer readable medium comprising: i) a system model, the system model comprising a meta-data model representation controlled by only a stakeholder and an asset-logic model representation controlled by only the stakeholder or another stakeholder; ii) a notification module for notifying only at least one of the stakeholder and the another stakeholder of a manipulation of at least one of the meta-data model representation and the asset-logic model representation; iii) a recording module for recording each manipulation approved or rejected by the at least one of the stakeholder and the another stakeholder; and iv) a transformation module for transforming the system model by correlating only each approved manipulation between the meta-data model representation and the asset-logic model representation.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

Figure 1:
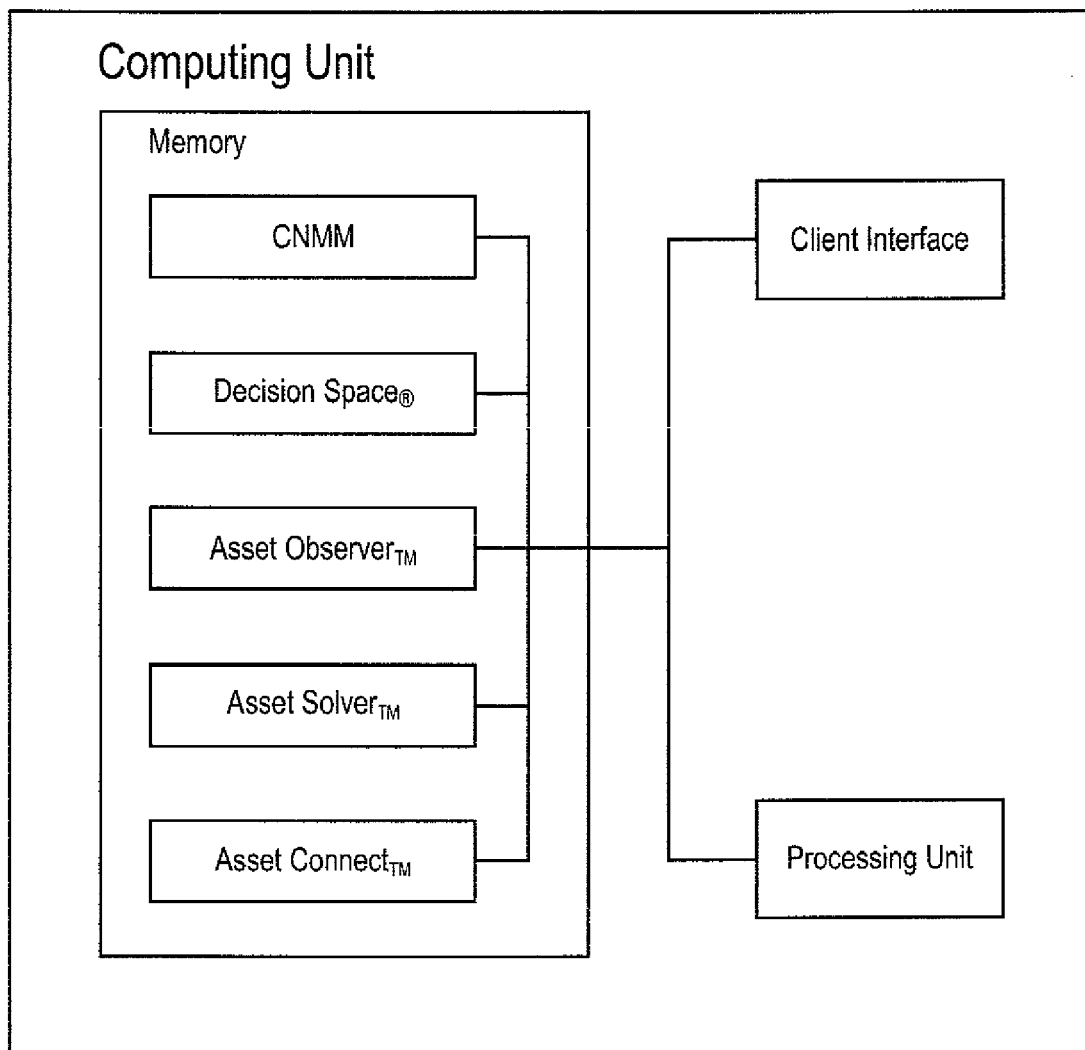
FIG. 1 is a block diagram illustrating a system for implementing the present invention.

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

The present invention provides a model based solution to select the appropriate level of model detail for the preferences of dissimilar users, also referred to herein as clients or stakeholders. Unlike the prior art, the present invention correlates different models. Thus, the present invention permits moving between models with different levels of detail. Moreover, while different models with various levels of detail may be known in the art, the present invention, instead, provides the opportunity to utilize different models in a single application with each model related to a common system model.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 1, a block diagram of a system for implementing the present invention on a computer is illustrated. The system includes a computing unit, sometimes referred to as a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 2-7. The memory therefore, includes a CNMM Module, which enables the method illustrated and described in reference to FIG. 7. The CNMM4 Module includes a collaborative-network-matrix model, also known as a system model, which is illustrated and described in reference to FIGS. 2-7. The CNMM Module also may interact with DecisionSpace®, AssetObserver™, AssetSolver™ and AssetConnect™ as further described in reference to FIG. 2. The systems and methods of the present invention are thus, based on a system model that correlates meta-data-model representations of a production asset with the various asset-logic model representations (or taxonomies) to provide a collaborative, consistent, and relevant representation of the asset to the different stakeholders. The system model performs the correlations between different meta-data model representations using the various asset-logic model representations for common data items and attributes shared across the system thus, addressing the many key activities relating to the asset that may have different meta-model representations representing their pertinent data requirements. In this manner, effective interoperability is achieved.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM), A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Figure 2:
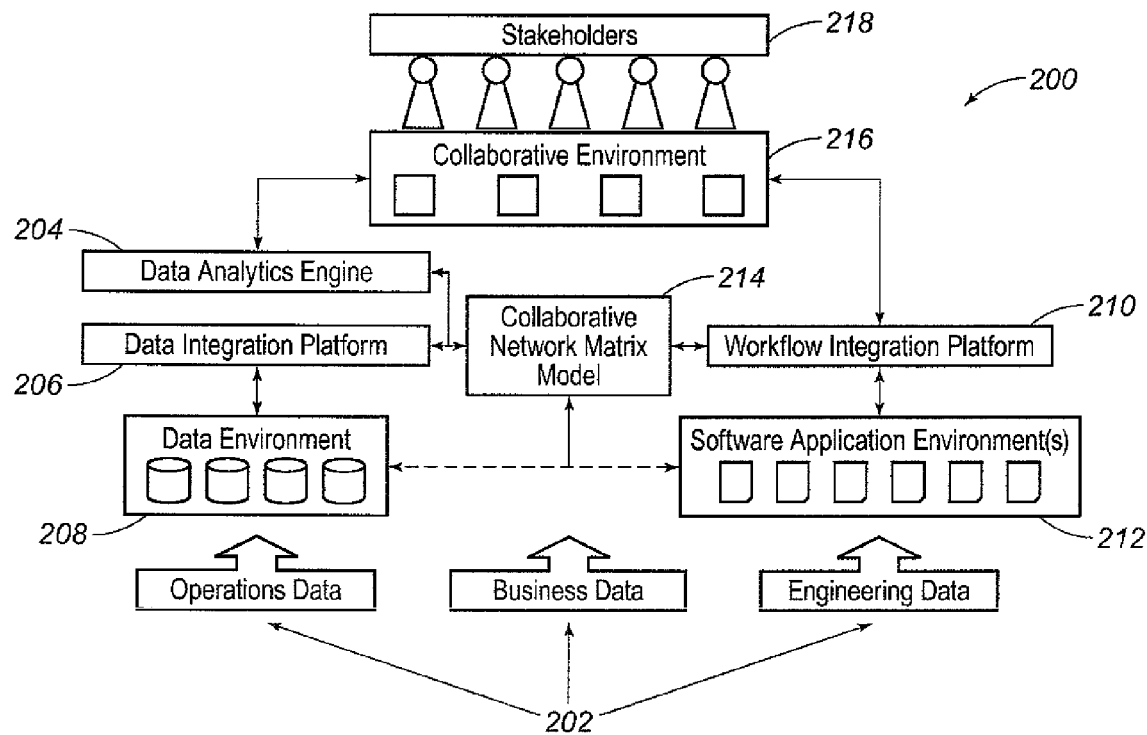
FIG. 2 illustrates the collaborative network matrix model of the present invention in relation to a wider system for collaboration.

Referring now to FIG. 2, a collaborative-network-matrix model (system model 214) is illustrated within a wider system 200 for collaboration among multiple clients referred to as stakeholders 218. Additional system components typically associated with a production asset may include, for example, different types of data 202 (e.g. operations data, business data and engineering data), a data analytics engine 204, a data integration platform 206, a data environment 208, a workflow integration platform 210, a software applications environment 212 and a collaborative environment 216. The various components of the system 200 enable specific inter-related functions and therefore, must interact with each other seamlessly in order to avoid discontinuities and/or errors. The role of the system model 214 is to provide interoperability across the various diverse applications and datasets within the overall system 200. Thus, the system model 214 functions as a common base model for collaboration among the stakeholders 218. Other components of the system 200 may include interfaces to and from an Enterprise Resource Planning System (e.g. SAP) or a computerized Maintenance Management System, or a computerized Work Management System controlling work in the physical asset and necessary status of equipment and system isolations.

The data analytics engine 204 allows data to be manipulated to produce numerous reports and analysis using simple to complex proprietary and industry standard algorithms. It typically supports data filtering and cleaning as well as appropriate visualization technologies to present data in meaningful, relevant and insightful ways into the viewing or collaborative environment 216 for use by the stakeholders 218.

The data integration platform 206 typically provides data connectors appropriate to each data language and database. This component allows the stakeholders 218 to map to particular data sets such as asset equipment tags or unique well identifiers, thus enabling data flow throughout the system 200.

The data environment 208 typically interfaces with some regulatory or distributed control system incorporating data to and from instruments, meters, and control devices, such as actuators, valves and the like, across the asset. Considering the typical functions of each component, the data environment 208 typically includes multiple types of data 202, each designed to best suit particular types of data. For example, a relational database for business data, a data historian for high frequency operations data and a data warehouse for engineering data such as well tables and production allocation tables. The data will exist in one or more data languages, such as, for example, OPC, ODBC, HTML, WITSML, and PRODML, which are well known in the art and conform to respective corresponding data standards.

The workflow integration and orchestration platform 210 spans the various IT operating environments, connects to the numerous software applications, maps to the respective data tags and items used by the software applications and interfaces with some viewing or shared collaborative environments to interface and interact with numerous stakeholders 218 involved across the workflows. The workflows are numerous but might include frequent and infrequent activities such as, for example, well test validation, production allocation, production surveillance, production optimization and others more particularly described in U.S. patent application Ser. No. 12/266,766, which is incorporated herein by reference.

The software applications environment(s) 212 includes different IT operating environments such as Windows and Linux, appropriate to the range of applications used across the asset. The software applications environment(s) 212 may also include well known, proprietary applications for providing diverse, complex, and relatively simple functionality. These applications, for example, may include petro-technical and geoscience applications common to the industry as well as more common software applications commonly used such as MS Office. These applications may also be used for, but not limited to, reservoir and well simulation, modeling of hydraulic networks and facilities systems, material balance, nodal analysis, production allocation, production surveillance, hydrocarbon accounting, regulatory reporting, and economics. These applications may be proprietary or customized and will invariably incorporate and use a multitude of algorithms, units, and annotations. These applications will also manipulate and transform existing data and generate further data in ways unique to the applications.

The function of the system model 214 is to manage the numerous interfaces and interactions between the data items and their correct and consistent usage within the various logic schemes that are representative of the system 200 and its architecture. It does so in a dynamic operating environment where all or many of the components may be used simultaneously and/or continuously by the stakeholders 218, which may be given specific and varying access and authority rights to control the components.

The collaborative environment 216 typically represents a web-based (intranet or interet) access and viewing environment that can be used by a diverse range of potential geographically located stakeholders 218, which will provide secure access and bandwidths appropriate to the range of data and software applications included in the system 200. The use of portals will typically allow diverse stakeholders 218 to have relevant custom views of only the information they require from the system 200 and also may provide effective communications via e-mail, instant messaging, net meetings and the like.

DecisionSpace® for Production may be used to provide the system architecture, component integration and set of functionality illustrated in FIG. 2. The system model 214, however, interacts with AssetObserver™, AssetConnect™ and AssetSolver™ to achieve overall functionality. AssetObserver™ provides the data integration platform 206 and also the collaborative environment 216 for data organization and visualization within the overall system 200. AssetConnect, provides the software application environment(s) 212 and also the workflow integration platform 210, which, together, enable orchestration or technical workflows that utilize both technical applications and related data 202. AssetSolver™ provides the data analytics engine 204, which is capable of handling both high volume and real-time data about operations and aggregate historical data used for engineering purposes. Each of the components jointly and separately benefit from the functionality provided by the system model 214.

Figure 3:
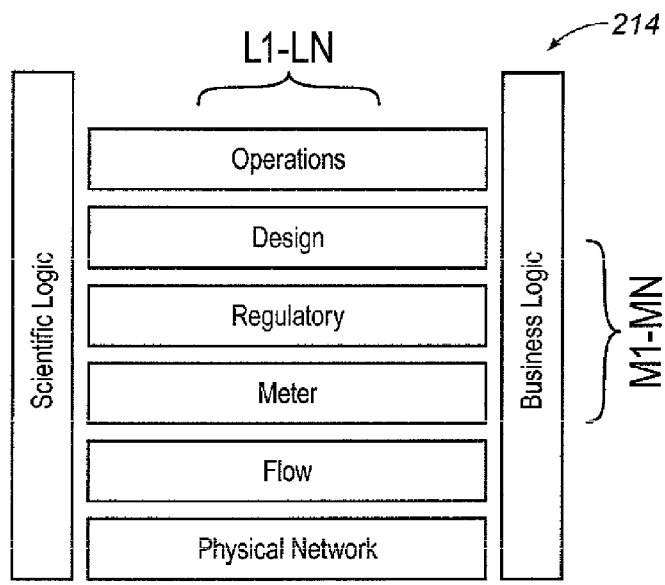
FIG. 3 is a block diagram illustrating the collaborative network matrix model in FIG. 2.

Referring now to FIG. 3, a block diagram of the collaborative-network-matrix model in FIG. 2 (system model 214) is illustrated. Initially, the system model 214 is static, meaning at rest, when transformations and manipulations are not occurring. During this time period, the system model 214 acts purely as a data router—providing the flow of appropriate information to different organizational stakeholders and/or applications. The system model 214 includes several components, such as the vertical components L1-LN, the horizontal components M1-MN, transformations and manipulations.

The vertical components L1-LN may include logical representations of the various taxonomies representative of the asset such as, for example, business logic, operations logic, engineering logic, scientific logic and organizational logic, among others. As illustrated in FIG. 3, the taxonomies include scientific logic and business logic.

The horizontal components M1-MN are meta-data model representations of specific key activities or stakeholder domains or other manifestations of meta-data model representations appropriate to the asset such as, for example, production data, business data, engineering data and equipment data, among others. As illustrated in FIG. 3, the meta data model representations include operations, design, regulatory, meter, flow and physical network. The meta-data model representations comprise numerous data items and their attributes.

Transformations are the routines for definition, identification and correlation of data items and attributes within the meta-data model representation layers, which are shared across the various asset-logic model representations. This might include, for example, algorithms, rules, units, logic and data transfer language, among others. Routines may include, for example, initial screening, searching, comparison and matching of the data items and attributes across the various components of the system model 214. Screening is an activity undertaken by proprietary software in order to identify the range of data attributes in the system model 214. Searching may involve a search engine to find the locations of such attributes and a comparison may utilize artificial intelligence (such as a neural network or expert system) in order to determine correlations and interrelationships between meta-data model representations and asset-logic model representations, across the system model 214. This function allows translation of common data items and attributes between one meta-data model representation layer and others.

Manipulations are automatically initiated at occurrence of an event and may include, for example: a) the various and multiple uses of data items and attributes across the asset by the multiple stakeholders using the diverse data sources, applications and programs common to a production asset, b) the control or subsequent change of those relatively static asset-logic model representations and meta-data model representations and/or the correlations or attributes of data items therein such as, for example: i) a permanent or temporary physical change to the production system configuration by insertion or removal of an item of equipment, ii) a change on the organization structure and/or individuals in a given role or to their approval authority or iii) modification to an engineering algorithm, and c) the control or subsequent change of the asset-logic model representations, the meta-data model representations and/or the correlations or attributes of data items therein such as, for example: i) a change to a valve brought about by, and consistent with, well testing operations or shutdown of an item of equipment for planned maintenance routines, or ii) the routine change to a modeled asset component, such as an inflow production ratio (IPR) curve, used routinely by production engineering.

Figure 4:
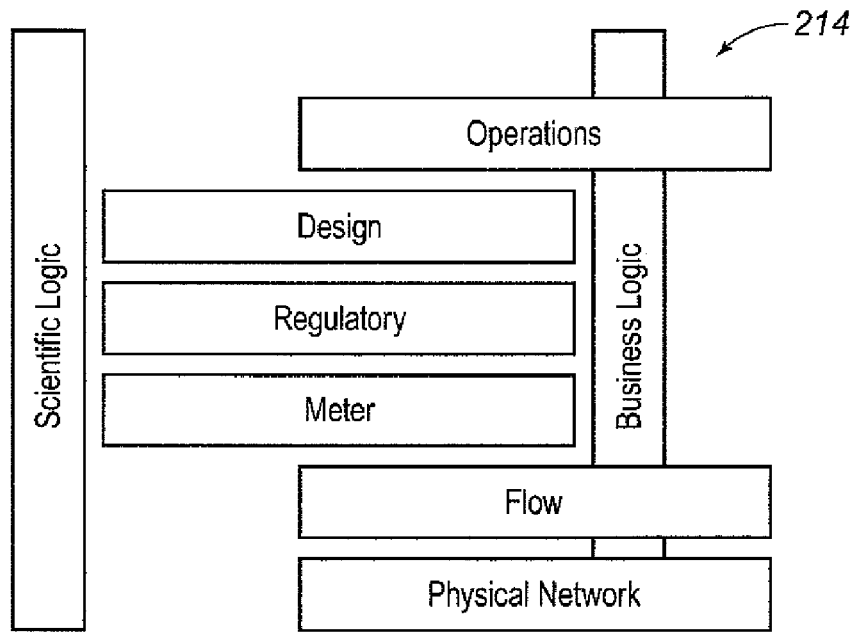
FIG. 4 is a block diagram illustrating the collaborative network matrix model in FIG. 2 after a system change.

Referring now to FIG. 4, a block diagram of the collaborative-network-matrix model in FIG. 2 (system model 214) is illustrated after a system change. A first stakeholder such as, for example, a production engineer may manipulate several horizontal components to reflect a system change that has occurred. In other words, a system change reflects a manipulation of the operations, flow and physical network meta-data model representations.

Figure 5:
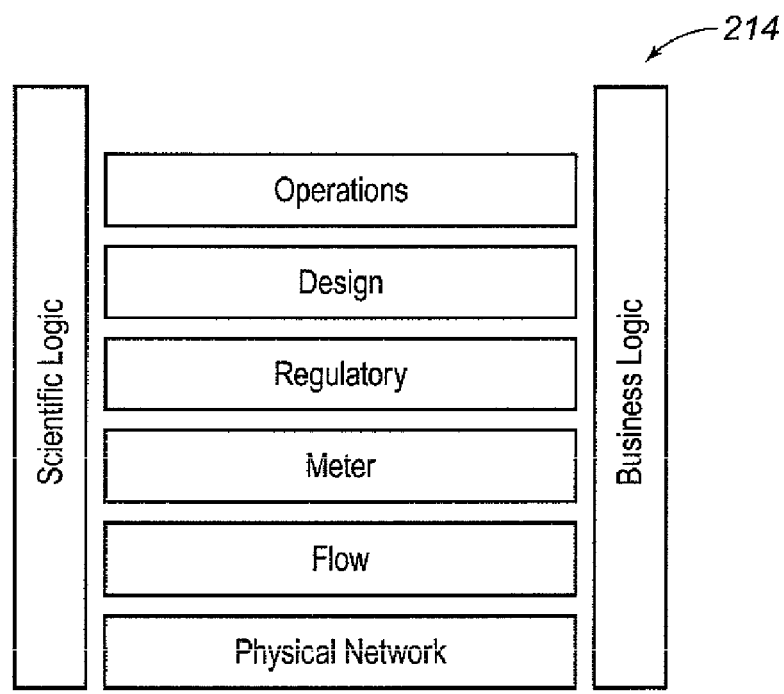
FIG. 5 is a block diagram illustrating the collaborative network matrix model in FIG. 2 as a transformation.

Referring now to FIG. 5, a block diagram of the collaborative-network-matrix model in FIG. 2 (system model 214) is illustrated as a transformation. Between each horizontal component and across the asset-logic model representations (vertical components), proprietary transformation routines are applied to appropriately account for the first stakeholder's manipulation-resulting in a system change across the system model 214. A change in any horizontal component may also effect change to other horizontal components and/or vertical components affected by the change, subject to agreement and approval of the designated owner (stakeholder) in control of the impacted logic, meta-data model representation or data item. Variable data attributes will not initiate change controls, which apply to only fixed or determined data items and attributes. The system model 214 is able to determine which stakeholder or stakeholders need to be informed of the changes to the horizontal components and/or vertical components and who initiated the change(s). This is achieved through an event notification service. The status of the components may be tracked during periods of change to ensure appropriate adjustment according to outcome of the system change controls. The system model 214 may be housed within a data repository with real time audit control. This mechanism is utilized to track component changes. Components of the system model 214 may be designated more or less critical at the establishment of the system model 214 such that risk can be determined and communicated with alerts to the system stakeholders. The system model 214 may record rejected and approved changes and effect resulting necessary transformations across the system model 214. Approval's are generated either by human interaction with the system or by a logic based expert system.

Figure 6:
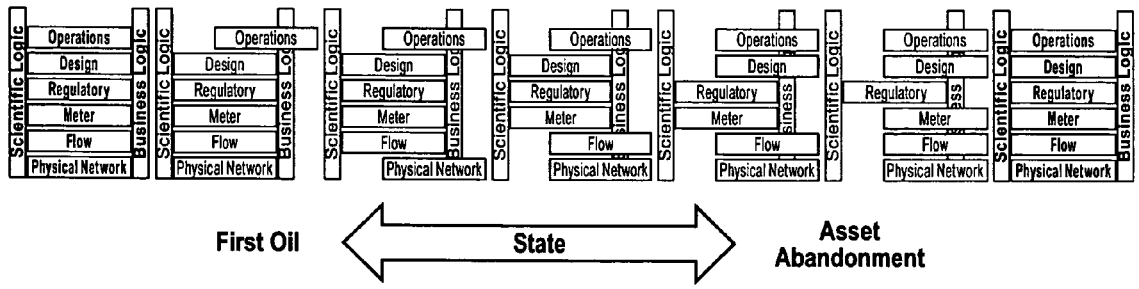
FIG. 6 illustrates the development and change of a collaborative network matrix model over time.

Referring now to FIG. 6, the development and change of a collaborative network matrix model over time is illustrated. Each iterative change is captured by the system and is fully auditable. Changes can include changes to stakeholders, asset-logic model representations, meta-data model representations and/or data items and attributes.

Method Description

Figure 7:
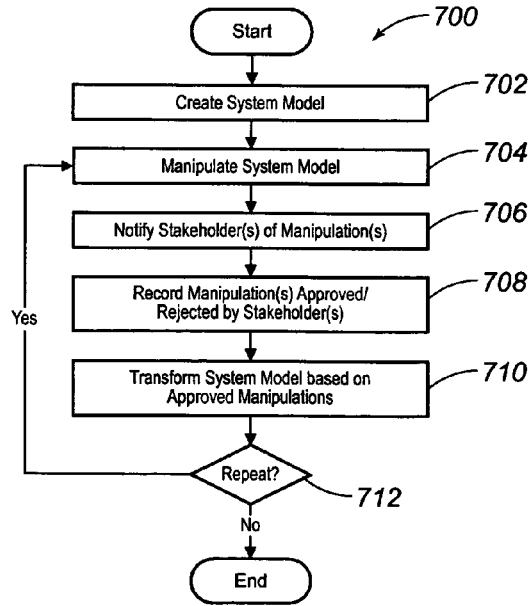
FIG. 7 is a flow diagram illustrating one embodiment of a method for implementing the present invention.

Referring now to FIG. 7, a flow diagram illustrates one embodiment of a method 700 for implementing the present invention.

In step 702, a system model is created, which comprises one or more meta-data model representations and one or more asset-logic model representations. The system model may include, for example, the same meta-data model representations and/or asset logic model representations described in reference to FIGS. 2-5. Furthermore, the system model may operate, for example, in the same manner as the system model described in reference to FIGS. 1-6. Each meta-data model representation may be controlled by one or more respective stakeholders and each asset-logic model representation may be controlled (owned) by one or more respective stakeholders. In other words, each meta-data model representation may be controlled by a respective stakeholder and each asset-logic model representation may be controlled by a respective stakeholder. Optionally, any respective stakeholder may control more than one meta-data model representation and/or more than one asset-logic model representation. Conversely, each meta-data model representation and each asset-logic model representation should not be controlled by more than one respective stakeholder however, may be controlled by more than one stakeholder under exceptional circumstances. Each meta-data model representation may include at least one data item and an attribute. Likewise, each asset-logic model representation may include at least one data item and an attribute.

In step 704, the system model is manipulated using a GUI or other means well known in the art. A collaborative environment and/or API may be utilized within a wider system to facilitate manipulation of the system model. The system model may be manipulated, for example, by a manipulation of one or more of the meta-data model representations and/or one or more of the asset-logic model representations. A manipulation therefore, may represent a change to at least one of the meta-data model representations and the asset-logic model representations. The system model may be manipulated on a computer system by any stakeholder. Each stakeholder therefore, may access the system model through a collaborative environment to manipulate the system model on the computer system. Each stakeholder therefore, may control one or more meta-data model representations and/or asset-logic model representations, while having access to the system model through a collaborative environment for purposes of manipulating the system model. Each stakeholder however, having access to the system model through a collaborative environment for purposes of manipulating the system model may not have control of one or more meta-data model representations and/or asset-logic model representations.

In step 706, each stakeholder in control of the one or more meta-data model representations and/or the one or more asset-logic model representations is notified of a manipulation of each respective meta-data model representation and/or each respective asset-logic model representation controlled by each respective stakeholder. A collaborative environment and/or API may be utilized within a wider system to facilitate notification of each manipulation. In this manner, for example, a stakeholder may manipulate one or more of the meta-data model representations and/or one or more of the asset-logic model representations, which it does not control, and only each stakeholder in control of each respective manipulated meta-data model representation and/or asset-logic model representation is notified of the manipulation.

In step 708, each manipulation approved or rejected by each respective stakeholder in control of the manipulated meta-data model representation(s) and/or asset-logic model representation(s) is recorded by the system model. Each approved manipulation therefore, may represent a change to a data item and/or an attribute in one or more of the meta-data model representations and/or one or more of the asset-logic model representations.

In step 710, the system model is transformed on a computer system based on the approved manipulation(s) by correlating each approved manipulation between the meta-data model representation(s) and the asset-logic model representation(s). Transforming the system model comprises using at least one routine for correlating each approved manipulation between the meta-data model representation(s) and the asset-logic model representation(s).

In step 712, the method 700 determines whether to repeat. If the method 700 is repeated, then the method 700 proceeds to step 704. If the method 700 does not repeat, then the method 700 ends.

The system model may be deployed in conjunction with a production allocation application whereby data pertaining to allocation changes to the production system might be more readily identified and for differing purposes such as technically correct allocation and fiscal allocation for operations, engineering and/or business uses. Other applications utilizing the system model may include, for example, production loss reporting, whereby the various causes of lost production might be attributed as they are reported, understood and associated with relevant operations, engineering and business data and uses.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A computer implemented method for correlating meta-data model representations and asset-logic model representations, comprising:

manipulating a system model, the system model comprising a meta-data model representation controlled by only a stakeholder and an asset-logic model representation controlled by only the stakeholder or another stakeholder;

notifying only at least one of the stakeholder and the another stakeholder of a manipulation of at least one of the meta-data model representation and the asset-logic model representation;

recording each manipulation approved or rejected by the at least one of the stakeholder and the another stakeholder; and transforming the system model on a computer system by correlating only each approved manipulation between the meta-data model representation and the asset-logic model representation.

2. The method of claim 1, wherein the manipulation of the at least one of the meta-data model representation and the asset-logic model representation represents a change to at least one of the meta-data model representation and the asset-logic model representation.

3. The method of claim 2, wherein the meta-data model representation comprises at least one of a data item and an attribute, and the asset-logic model representation comprises at least one of the data item and the attribute.

4. The method of claim 1, wherein transforming the system model comprises using at least one routine for correlating each approved manipulation between the meta-data model representation and the asset-logic model representation.

5. The method of claim 1, wherein each approved manipulation of the at least one of the meta-data model representation and the asset-logic model representation represents a change to at least one of a data item and an attribute in at least one of the meta-data model representation and the asset-logic model representation.

6. The method of claim 1, further comprising:
manipulating the system model, the system model comprising another meta-data model representation controlled by only a new stakeholder and another asset-logic model representation controlled by only the new stakeholder or another new stakeholder;
notifying only at least one of the stakeholder, the another stakeholder, the new stakeholder and the another new stakeholder of a manipulation of at least one of the meta-data model representation, the asset-logic model representation, the another meta- data model representation and the another asset-logic model representation;
recording each manipulation approved or rejected by the at least one of the stakeholder, the another stakeholder, the new stakeholder and the another new stakeholder; and
transforming the system model by correlating only each approved manipulation between the meta-data model representation, the another meta-data model representation, the asset-logic model representation, and the another asset-logic model representation.

7. The method of claim 1, wherein the system model is manipulated by a new stakeholder and only the stakeholder is notified of a manipulation of the meta-data model representation and only the stakeholder or the another stakeholder is notified of a manipulation of the asset-logic model representation.

8. The method of claim 1, wherein the system model is manipulated on the computer system by a new stakeholder.

9. The method of claim 8, wherein the stakeholder, the another stakeholder and the new stakeholder access the system model through a collaborative environment.

10. A non-transitory program carrier device tangibly carrying computer executable instructions for correlating meta-data model representations and asset-logic model representations, the instructions being executable to implement:
manipulating a system model, the system model comprising a meta-data model representation controlled by only a stakeholder and an asset-logic model representation controlled by only the stakeholder or another stakeholder;
notifying only at least one of the stakeholder and the another stakeholder of a manipulation of at least one of the meta-data model representation and the asset-logic model representation;
recording each manipulation approved or rejected by the at least one of the stakeholder and the another stakeholder; and
transforming the system model by correlating only each approved manipulation between the meta-data model representation and the asset-logic model representation.

11. The program carrier device of claim 10, wherein the manipulation of the at least one of the meta-data model representation and the asset-logic model representation represents a change to at least one of the meta-data model representation and the asset-logic model representation.

12. The program carrier device of claim 11, wherein the meta-data model representation comprises at least one of a data item and an attribute, and the asset-logic model representation comprises at least one of the data item and the attribute.

13. The program carrier device of claim 10, wherein transforming the system model comprises using at least one routine for correlating each approved manipulation between the meta-data model representation and the asset-logic model representation.

14. The program carrier device of claim 10, wherein each approved manipulation of the at least one of the meta-data model representation and the asset-logic model representation represents a change to at least one of a data item and an attribute in at least one of the meta-data model representation and the asset-logic model representation.

15. The program carrier device of claim 10, further comprising:
manipulating the system model, the system model comprising another meta-data model representation controlled by only a new stakeholder and another asset-logic model representation controlled by only the new stakeholder or another new stakeholder;
notifying only at least one of the stakeholder, the another stakeholder, the new stakeholder and the another new stakeholder of a manipulation of at least one of the meta-data model representation, the asset-logic model representation, the another meta-data model representation and the another asset-logic model representation;
recording each manipulation approved or rejected by the at least one of the stakeholder, the another stakeholder, the new stakeholder and the another new stakeholder; and
transforming the system model by correlating only each approved manipulation between the meta-data model representation, the another meta-data model representation, the asset-logic model representation, and the another asset-logic model representation.

16. The program carrier device of claim 10, wherein the system model is manipulated by a new stakeholder and only the stakeholder is notified of a manipulation of the meta-data model representation and only the stakeholder or the another stakeholder is notified of a manipulation of the asset-logic model representation.

17. The program carrier device of claim 10, wherein the system model is manipulated by a new stakeholder.

18. The program carrier device of claim 17, wherein the stakeholder, the another stakeholder and the new stakeholder access the system model through a collaborative environment.

19. A computer readable medium carrying computer executable instructions for correlating meta-data model representations and asset-logic model representations, the computer readable medium comprising:
a system model, the system model comprising a meta-data model representation controlled by only a stakeholder and an asset-logic model representation controlled by only the stakeholder or another stakeholder;
a notification module for notifying only at least one of the stakeholder and the another stakeholder of a manipulation of at least one of the meta-data model representation and the asset-logic model representation;
a recording module for recording each manipulation approved or rejected by the at least one of the stakeholder and the another stakeholder; and a transformation module for transforming the system model by correlating only each approved manipulation between the meta-data model representation and the asset-logic model representation.

20. The computer readable medium of claim 19, wherein the system model is manipulated on the computer system by a new stakeholder and the stakeholder, the another stakeholder and the new stakeholder access the system model through a collaborative environment.

* * * * *